United States Patent
Gambut-Garel et al.

(10) Patent No.: US 7,744,772 B2
(45) Date of Patent: Jun. 29, 2010

(54) CROSS-LINKABLE COMPOSITION FOR A BATTERY ELECTROLYTE

(75) Inventors: Lucile Gambut-Garel, Lyons (FR); Carroll Vergelati, Saint Baudille de la Tour (FR); Jean-Yves Sanchez, Saint Ismier (FR); Fannie Alloin, Vizille (FR)

(73) Assignee: Rhodia Chimie, Aubervilliers (FR)

( * ) Notice: Subject to any disclaimer, the term of this patent is extended or adjusted under 35 U.S.C. 154(b) by 1036 days.

(21) Appl. No.: 10/551,712

(22) PCT Filed: Mar. 23, 2004

(86) PCT No.: PCT/FR2004/000707

§ 371 (c)(1),
(2), (4) Date: Jun. 28, 2006

(87) PCT Pub. No.: WO2004/091033

PCT Pub. Date: Oct. 21, 2004

(65) Prior Publication Data

US 2007/0128522 A1 Jun. 7, 2007

(30) Foreign Application Priority Data

Apr. 3, 2003 (FR) .................................. 03 04150

(51) Int. Cl.
*H01M 10/40* (2006.01)

(52) U.S. Cl. .................... 252/62.2; 429/189; 429/306; 429/307; 429/313; 429/317

(58) Field of Classification Search ................ None
See application file for complete search history.

(56) References Cited

U.S. PATENT DOCUMENTS

| 5,112,512 A * | 5/1992 | Nakamura ................ 252/62.2 |
| 2002/0028388 A1 * | 3/2002 | Lee ............................ 429/303 |
| 2002/0051911 A1 * | 5/2002 | Okada ........................ 429/313 |
| 2003/0198869 A1 * | 10/2003 | West et al. .................. 429/313 |

* cited by examiner

*Primary Examiner*—Jonathan Crepeau
*Assistant Examiner*—Tony Chuo
(74) *Attorney, Agent, or Firm*—Buchanan Ingersoll & Rooney PC

(57) ABSTRACT

The field of the present invention relates to the field of batteries and of polymer electrolytes for batteries and more particularly to the field of lithium batteries.

The invention relates to a composition which can be polymerized and/or crosslinked photochemically or under an electron beam for a battery electrolyte comprising:
(a) at least one polyorganosiloxane (POS) (A) comprising, per molecule
   at least 2 siloxyl units carrying radicals comprising an epoxy (Epx) functional group with optionally an ether (Eth) functional group, and
   at least one of the siloxyl units carries a polyoxyalkylene (Poa) ether radical;
(b) at least one electrolyte salt ; and
(c) an effective amount of at least one cationic photoinitiator.

28 Claims, No Drawings

CROSS-LINKABLE COMPOSITION FOR A BATTERY ELECTROLYTE

CROSS-REFERENCE TO RELATED APPLICATIONS

This application is a 35 U.S.C. §371 application of International Application No. PCT/FR2004/000707, filed Mar. 23, 2004, published in French as WO 2004/091033 on Oct. 21, 2004, and claims priority of French Application No. 03/04150, filed Apr. 3, 2003, the disclosures of both applications being incorporated herein in their entirety.

BACKGROUND

1. Field of the Invention

The field of the present invention relates to the field of batteries and of polymer electrolytes for batteries and more particularly to the field of lithium batteries.

More specifically, a subject matter of the present invention is a novel polymerizable and/or crosslinkable composition for a battery electrolyte, a novel polymer electrolyte obtained by polymerization and/or crosslinking of this novel composition, and a novel polymer battery.

2. Description of Related Art

Historically, lead batteries have been the most commonly used. However, there were numerous disadvantages to the lead technology, related to the weight of the batteries, to the unreliability during operation and to the use of a corrosive liquid. This led to the development of alkaline batteries, the electrodes of which were either based on nickel and cadmium (nickel—cadmium batteries), or based on zinc and nickel oxide (zinc—nickel batteries), or based on silver oxide coupled to zinc, cadmium or iron (silver oxide batteries). All these technologies use a potassium hydroxide solution as electrolyte and exhibit the major disadvantage of a low energy density by weight with regard to the requirements related to the development of portable devices. Thus it is that manufacturers have developed a new industry based on lithium batteries using a negative electrode based on lithium metal (hence the name "lithium metal battery"). However, problems related to poor restoration of the negative lithium electrode during successive chargings quickly resulted in a novel type of negative electrode based on carbon, used as insertion compound for lithium (hence the name "lithium ion battery").

The operating principle for lithium batteries is summarized in the following way:

During the electrochemical charging, the transition metal ions of the positive electrode are oxidized, which results in the deintercalation of the lithium. Electrons are forced to move through the external circuit and a molar equivalent amount of lithium ions passes through the electrolyte, which is an ionic conductor and electronic insulator. This makes possible the intercalation of the lithium at the negative electrode. During the discharge of the battery, that is to say during use, it is the reverse phenomenon which occurs spontaneously.

In batteries, the ionic conductor or electrolyte, which separates the electrodes, is a key component. First, its state, liquid, solid or gelled, affects the safety of the system and, secondly, its conductivity determines the operating temperature range. Liquid electrolytes based on carbonates are commonly used. However, they do not exhibit the optimum safety conditions related to the handling of a corrosive liquid. This is because this type of battery can be the site of episodes, such as a thermal runaway, resulting in the formation of gas, thus increasing the internal pressure of the battery and the risk of explosion. It is for this reason that strict safety standards require manufacturers to use sophisticated cases, thus increasing the cost price of a unit.

In order to overcome this major disadvantage, the battery industry has developed a novel technology based on solid polymer electrolytes comprising a lithium anode, hence the name of "lithium polymer battery". Due to its solid nature and being in the film form, this novel type of electrolyte makes possible the development of a safer battery having a great variety of shapes. The thinness of the films formed makes possible an increase in the energy efficiency at a low current density. One of the first "dry polymers" studied was polyoxyethylene for transportation applications. However, one of the disadvantages of this type of polymer is related to a low conductivity for use at ambient temperature and a fortiori at low temperatures. This is thus one of the major disadvantages which becomes critical for use of these batteries under extreme conditions, such as, for example, for geostationary satellite batteries operating in space.

The experts concerned have thus attempted to develop novel polymer electrolytes. By way of illustration, international application WO 2000/25323 discloses a composition which can be crosslinked to form a battery polymer electrolyte comprising a polysiloxane composed of polyoxyethylene groups or of cyclic carbonate groups having at least two reactive SiH groups, a crosslinking agent having at least two reactive groups of alkenyl type, a hydrosilylation catalyst and an electrolyte salt. This composition is crosslinked thermally by heating between 70 and 100° C. for a time of approximately 6 hours to produce an electrolyte polymer. The major disadvantages of this type of preparation are related to the high energy cost for manufacture of the electrolyte polymer and to a slow crosslinking rate which is a curb on industrial application.

The industries of the technical field under consideration are therefore waiting for novel compositions for a battery electrolyte which make it possible to obtain electrolyte polymers having sufficient levels of conductivity for use in a suitable temperature range extending from −20° C. to +80° C. and polymer electrolytes employing preparation routes with a low energy cost.

SUMMARY OF THE INVENTION

The main object of the present invention is thus to provide a novel polymerizable and/or crosslinkable composition for a battery polymer electrolyte which makes it possible to obtain electrolyte polymers having sufficient levels of conductivity for use in a suitable temperature range extending from −20° C. to +80° C.

Another object of the present invention is to provide novel compositions for a battery polymer electrolyte, which can be polymerized and/or crosslinked photo-chemically or under an electron beam, which do not require a high energy cost for the preparation of the electrolyte polymer.

Another aim of the invention is to provide a novel polymerizable and/or crosslinkable composition for a battery polymer electrolyte which makes it possible to obtain electrolyte polymers according to high crosslinking rates.

The invention is also targeted at a solid polymer electrolyte obtained by polymerization and/or crosslinking of the composition according to the invention.

Finally, the invention is targeted at a polymer battery and more particularly at a lithium polymer battery.

These objects, among others, are achieved by the present invention, which relates to a composition which can be polymerized and/or crosslinked under irradiation, preferably actinic irradiation and/or by (an) electron beam(s), by the cationic route, for a battery electrolyte, characterized in that it comprises:
(a) at least one polyorganosiloxane (POS) (A) comprising siloxyl units of formula (I):

$$R^1_x R^2_y R^3_z SiO_{(4-x-y-z)/2} \quad (I)$$

in which formula the various symbols have the following meanings:
  x, y and z are integers with $1 \leq x+y+z \leq 3$;
  the $R^1$, $R^2$ and $R^3$ radicals are identical to or different from one another and represent an optionally substituted, linear or branched, $C_1$-$C_{12}$ alkyl radical, an optionally substituted $C_5$-$C_{10}$ cycloalkyl radical, an optionally substituted $C_6$-$C_{18}$ aryl radical, an optionally substituted aralkyl radical or an —$OR^4$ radical where $R^4$ represents a hydrogen or a linear or branched alkyl radical having from 1 to 15 carbon atoms, and
  with the conditions that the POS (A) comprises, per molecule:
    at least 2 siloxyl units of formula (I), one of the radicals of which comprises a functional group of epoxy type (Epx) and optionally a functional group of ether type (Eth); and
    at least one of the siloxyl units of formula (I) comprises at least one polyoxyalkylene (Poa) ether radical;
(b) at least one electrolyte salt; and
(c) an effective amount of at least one cationic photoinitiator.

DETAILED DESCRIPTION OF THE INVENTION

According to a first alternative form of the invention, the composition as defined above can include at least one POS (B), the siloxyl units of which are defined by the formula (II) identical to the formula (I), with the condition that the POS (B) comprises, per molecule, at least 2 siloxyl units comprising a functional group of epoxy type (Epx) and optionally a functional group of ether type (Eth).

It should be noted that the radicals carrying a functional group of epoxy type (Epx) exhibit the advantage of being simultaneously reactive with regard to the crosslinking or polymerization by resulting in the formation of bridges of polyether type after crosslinking or polymerization, which is a factor highly favorable for the conductivity of the polymer electrolyte. The possible presence of functional group of ether type (Eth) in the same radical further enhances the advantageous effect on the conductivity of the polymer electrolyte.

The term "effective amount of at least one cationic photoinitiator" is understood to mean, within the meaning of the invention, the amount sufficient to initiate the polymerization or crosslinking. This amount should be as small as possible in order to make possible better storage over time of the composition. Concentrations of use as cationic photoinitiator lie between 0.1% and 2% and preferably between 0.2% and 1% by weight.

Advantageously, the radicals carrying a functional group of epoxy type (Epx) and which can optionally carry a functional group of ether type (Eth) are chosen from the following radicals:

(III)

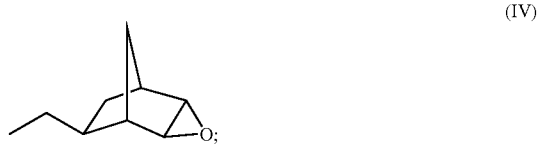
(IV)

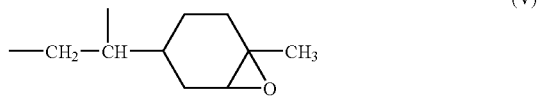
(V)

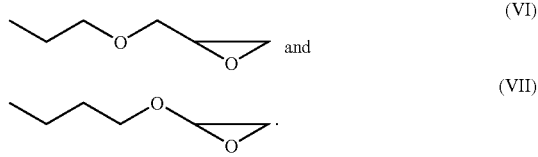
(VI)

and (VII)

More particularly, the POS (A) is an essentially linear random or block copolymer of following mean general formula (VIII):

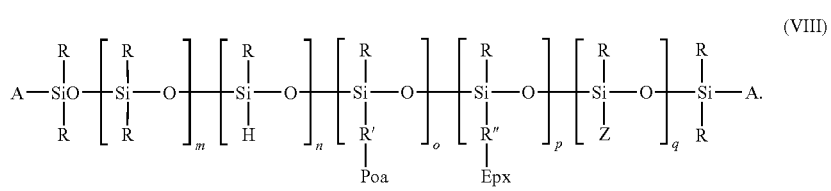

which can optionally comprise units of formula $RSiO_{3/2}$ (T) (the maximum % of T units will be determined so that the composition remains in a liquid form), in which formula:
  the R symbols, which are identical to or different from one another, each represent an optionally substituted, linear or branched, $C_1$-$C_{12}$ alkyl radical, in particular methyl, ethyl, n-propyl, isopropyl or n-butyl, preferably methyl, a $C_6$-$C_{18}$ aryl radical, in particular a phenyl radical, which is optionally substituted, an optionally substituted $C_5$-$C_{10}$ cycloalkyl radical or an optionally substituted aralkyl radical;
  the Z symbols, which are identical to or different from one another, each represent a hydroxyl radical or a linear or branched alkoxyl radical having from 1 to 15 carbon atoms;
  the R' symbols, which are identical to or different from one another, each represent a radical comprising from 2 to 50, preferably from 2 to 20, carbon atoms and more preferably still an n-propyl radical;
  the Poa symbols, which are identical to or different from one another, each represent groups of polyoxyalkylene ether type, preferably polyoxyethylene ether and/or polyoxypropylene ether groups and more preferably still an —O—(CH$_2$CH$_2$O)$_m$—CH$_3$ group with m≦14;

the R" symbols, which are identical to or different from one another, each represent a radical comprising from 2 to 50, preferably from 2 to 20, carbon atoms, which radical can optionally comprise functional groups of —O— ether type;

the (Epx) symbols represent an epoxy functional group, this functional group being either present as ending of the R" hydrocarbon chain, of the following type:

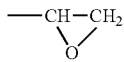

or in an intermediate position of the R" hydrocarbon chain, of the following type:

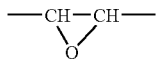

it being possible for this intermediate position to be present on a cyclic part of the chain, in particular a ring having from 5 to 7 members, preferably a 6-membered ring;

the A symbols, which are identical to or different from one another, each represent a monovalent radical chosen from —R, H, —R"-Epx and —OR$^4$, where R$^4$ represents a hydrogen or a linear or branched alkyl radical having from 1 to 15 carbon atoms;

m is an integer or fractional number greater than or equal to 0, preferably between 5 and 200 and more preferably still between 10 and 100;

n is an integer or fractional number varying from 0 to 5; and represents the number of residual SiH units;

o is an integer or fractional number greater than or equal to 1, preferably between 1 and 100 and more preferably still between 5 and 30;

p is an integer or fractional number greater than or equal to 2, preferably between 3 and 200 and more preferably still between 10 and 40; and q is an integer or fractional number greater than or equal to 0; preferably between 0 and 10.

Preferably, the numbers m, o and p are chosen so as to satisfy the following condition:

the ratio (m+n+p+q)/o≦10, preferably between 2 and 8 and more preferably still between 3 and 5.

Advantageously, the groups of —R"-Epx type are chosen from the (III), (IV), (V), (VI) and (VII) groups defined above.

Preferably, the —R'-Poa groups are chosen from:
—(CH$_2$)$_3$—O—(CH$_2$CH$_2$—O)$_m$—CH$_3$; —(CH$_2$)$_2$—O—(CH$_2$CH$_2$—O)$_m$—CH$_3$; —(CH$_2$)$_3$—O—(CH(CH$_3$)—CH$_2$—O)$_m$—CH$_3$ and —(CH$_2$)$_2$—O—(CH(CH$_3$)—CH$_2$—O)$_m$—CH$_3$ where m≦14.

According to a noteworthy characteristic of the invention, the electrolyte salt (b) is composed:

of a cation chosen from the group consisting of the following entities: metal cations, ammonium ions, amidinium ions and guanidinium ions; and of an anion chosen from the group consisting of the following entities: chloride ions, bromide ions, iodide ions, perchlorate ions, thiocyanate ions, tetrafluoroborate ions, nitrate ions, AsF$_6^-$, PF$_6^-$, stearylsulfonate ions, trifluoromethanesulfonate ions, octylsulfonate ions, dodecylbenzenesulfonate ions, R$^4$SO$_3^-$, (R$^4$SO$_2$)(R$^5$SO$_2$)N$^-$ and (R$^4$SO$_2$)(R$^5$SO$_2$)(R$^6$SO$_2$)C$^-$;

in each formula, the R$^4$, R$^5$ and R$^6$ radicals are identical or different and represent electron-withdrawing groups.

Advantageously, the R$^4$, R$^5$ and R$^6$ radicals are chosen from electron-withdrawing groups of perfluoroaryl or perfluoroalkyl type, the perfluoroalkyl groups comprising from 1 to 6 carbon atoms.

According to one alternative form of the invention, the electrolyte salt (b) comprises a metal cation chosen from alkali metals and alkaline earth metals of Groups 1 and 2 of the Periodic Table [Chem. & Eng. News, vol. 63, No. 5, 26, of Feb. 4, 1985]. In a particularly advantageous way, the metal cation is either of lithium type or is chosen from transition metals, for example manganese, iron, cobalt, nickel, copper, zinc, calcium or silver.

The electrolyte salts of lithium type of use according to the invention can be chosen from the group consisting of the following compounds: LiClO$_4$, LiBF$_4$, LiPF$_6$, LiAsF$_6$, LiCF$_3$SO$_3$, LiN(CF$_3$SO$_2$)$_2$, LiN(C$_2$F$_5$SO$_2$)$_2$ and a mixture of these compounds.

Preferably, the amount of lithium electrolyte salt of the composition is defined so that the O/Li molar ratio is between 15 and 40, preferably between 10 and 30 and more preferably still between 20 and 25.

Although the polymer electrolyte according to the invention is a solid after crosslinking and/or polymerization, the teaching of the invention is not limited to the solid alone. This is because it is possible to add, to the composition, an organic electrolyte (d) in order to obtain, after crosslinking and/or polymerization, a liquid or gelled form. The choice will preferably fall on the compounds chosen from the group consisting of propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether.

The initiation of the polymerization and/or crosslinking of the composition according to the invention is rendered possible by virtue of the presence of the cationic photoinitiator (c). This is because the composition comprises polyorganosiloxanes (POSs) carrying epoxide functional groups which are reactive as the photoinitiator, after absorption of energy, for example UV energy, releases a strong acid, H$^+$ (hence the name "cationic photoinitiator"), which will make possible the initiation and the propagation of the chain polymerization by formation of entities.

Any cationic photoinitiator may be suitable according to the invention. Advantageously, the cationic photoinitiators can be chosen from borates of onium (taken alone or as a mixture of them) of an element from Groups 15 to 17 of the Periodic Table [Chem. & Eng. News, vol. 63, No. 5, 26 of Feb. 4, 1985] or of an organometallic complex of an element from Groups 4 to 10 of the Periodic Table [same reference].

The choice will be made, among the cationic photoinitiators of use according to the invention, of those with a formula for which the cationic entity of the borate is selected from:

a) onium cations of formula (IX):

$$[(R^1)_n\text{-A-}(R^2)_m]^+ \qquad (IX)$$

in which formula:

A represents an element from Groups 15 to 17, such as, for example: I, S, Se, P or N;

R$^1$ represents a C$_6$—C$_{20}$ carbocyclic or heterocyclic aryl radical, it being possible for said heterocyclic radical to comprise nitrogen or sulfur as heteroelements;

$R^2$ represents $R^1$ or a linear or branched $C_1$—$C_{30}$ alkyl or alkenyl radical; said $R^1$ and $R^2$ radicals optionally being substituted by a $C_1$—$C_{25}$ alkoxy, $C_1$—$C_{25}$ alkyl, nitro, chloro, bromo, cyano, carboxyl, ester or mercapto group;

n is an integer ranging from 1 to v+1, v being the valency of the element A; and m is an integer ranging from 0 to v−1, with n+m=v+1, b) organometallic cations of formula (X):

$$(L^1L^2L^3M)q+$$

in which formula:

M represents a metal from Groups 4 to 10, in particular iron, manganese, chromium or cobalt;

$L^1$ represents a ligand bonded to the metal M via π electrons, which ligand is chosen from $\eta^3$-alkyl, $\eta^5$—cyclopentadienyl and $\eta^7$—cycloheptatrienyl ligands and $\eta^6$-aromatic compounds chosen from $\eta^6$-benzene ligands which are optionally substituted and compounds having from 2 to 4 condensed rings, each ring being capable of contributing via 3 to 8π electrons to the valence layer of the metal M;

$L^2$ represents a ligand bonded to the metal M via π electrons, which ligand is chosen from $\eta^7$-cycloheptatrienyl ligands and $\eta^6$-aromatic compounds chosen from $\eta^6$-benzene ligands which are optionally substituted and compounds having from 2 to 4 condensed rings, each ring being capable of contributing via 6 or 7π electrons to the valence layer of the metal M; and $L^3$ represents from 0 to 3 identical or different ligands bonded to the metal M via σ electrons, which ligand(s) is (are) chosen from CO and $NO_2^+$; the total electronic charge q of the complex to which $L^1$, $L^2$ and $L^3$ and the ionic charge of the metal M contribute being positive and equal to 1 or 2;

c) oxoisothiochromanium cations having the formula (XI):

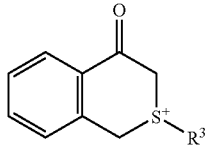

(XI)

where the $R^3$ radical represents a linear or branched $C_1$—$C_{20}$ alkyl radical, and d) the organometallic cations of formula (XIII):

$$(L_1L_2L_3M)^{q+} \quad (XIII)$$

in which formula:

M represents a metal from Groups 4 to 10, in particular iron, manganese, chromium or cobalt;

$L_1$ represents a ligand bonded to the metal M via π electrons, the ligand preferably being chosen from $\eta^3$-alkyl, $\eta^5$-cyclopentadienyl and $\eta^7$-cycloheptatrienyl ligands and $\eta^6$-aromatic compounds chosen from $\eta^6$-benzene ligands which are optionally substituted and compounds having from 2 to 4 condensed rings, each ring being capable of contributing via 3 to 8π electrons to the valence layer of the metal M;

$L_2$ represents a ligand bonded to the metal M via π electrons, the ligand preferably being chosen from $\eta^7$-cycloheptatrienyl ligands and $\eta^6$-aronmatic compounds chosen from $\eta^6$-benzene ligands which are optionally substituted and compounds having from 2 to 4 condensed rings, each ring being capable of contributing via 6 or 7π electrons to the valence layer of the metal M; and $L_3$ represents from 0 to 3 identical or different ligands bonded to the metal M via σ electrons, which ligand(s) is (are) chosen from CO and $NO_2^+$; the total electronic charge q of the complex to which $L_1$, $L_2$ and $L_3$ and the ionic charge of the metal M contribute being positive and equal to 1 or 2.

Other cationic photoinitiators of use according to the invention are chosen from the anionic entities of formula (XII):

$$[BX_aR_b]^- \quad (XII)$$

in which formula:

a and b are integers ranging from 0 to 4 with a+b=4;

the X symbols represent a halogen atom (chlorine, fluorine) with a=0 to 3 and an OH functional group (with a=0 to 2), the R symbols are identical or different and represent:

a) a phenyl radical substituted by at least one electron-withdrawing group chosen from $CF_3$, $NO_2$ or CN or by at least 2 fluorine atoms, this being the case when the cationic entity is an onium of an element from Groups 15 to 17, b) a phenyl radical substituted by at least one electron-withdrawing element or at least one electron-withdrawing group chosen from a fluorine atom, $CF_3$, $NO_2$ or CN, this being the case when the cationic entity is an organometallic complex of an element from the Groups 4 to 10, and/or c) an aryl radical comprising at least two aromatic rings which is optionally substituted by at least one electron-withdrawing element or at least one electron-withdrawing group chosen from a fluorine atom, $CF_3$, $NO_2$ or CN, whatever the cationic entity.

Without this being limiting, further details with regard to the subcategories of onium borate and of organometallic salt borate more particularly preferred in the context of the use in accordance with the invention are given below.

Particularly advantageously, the anionic entity of the cationic photoinitiator is chosen from the group consisting of:

$[B(C_6F_5)_4]^-$ $[B(C_6H_4CF_3)_4]^-$ $[B(C_6H_4CF_3)_4]^-$ $[(C_6F_5)_2BF_2]^-$ $[C_6F_5BF_3]^-$ $[B(C_6H_3F_2)_4]^-$ $[B(C_6F_4OCF_3)_4]^-$

According to another advantageous alternative form, the cationic entity of the cationic photoinitiator is chosen from the group consisting of:

$[(\Phi)_2I]^+$ $[C_8H_{17}$—$O$-$\Phi$-$I$-$\Phi]^+$ $[(\Phi$-$CH_3)_2I]^+$ $[C_{12}H_{25}$-$\Phi$-$I$-$\Phi]^+$ $[(C_8H_{17}$—$O$-$\Phi)_2I]^+$ $[C_8H_{17}$—$O$-$\Phi$-$I$-$\Phi]^+$ $[(\Phi)_3S]^+$ $[(\Phi)_2$-$S$-$\Phi$-$O$—$C_8H_{17}]^+$ $[CH_3$-$\Phi$-$I$-$\Phi$-$CH(CH_3)_2]^+$ $[\Phi$-$S$-$\Phi$-$S$-$(\Phi)_2]^+$ $[(C_{12}H_{25}$-$\Phi)_2I]^+$ $[CH_3$-$\Phi$-$I$-$\Phi$-$OC_2H_5]^+$ $(\eta^5$-cyclopentadienyl)($\eta$6-toluene)$Fe^+$, ($\eta$5-cyclopentadienyl)($\eta$6-1-methylnaphthalene)$Fe^+$, and ($\eta$5-cyclopentadienyl)($\eta$6-cumene)$Fe^+$.

The particularly suitable polymerization and/or crosslinking cationic photoinitiators are chosen from the group consisting of:

$[(\Phi)_2I]^+[B(C_6F_5)_4]^-$ $[(C_8H_{17})$—$O$-$\Phi$-$I$-$\Phi]^+[B(C_6F_5)_4]^-$ $[C_{12}H_{25}$-$\Phi$-$I$-$\Phi]^+[B(C_6F_5)_4]^-$ $[(C_8H_{17}$—$O$-$\Phi)_2I]^+[B(C_6F_5)_4]^{-[(C}_8H_{17})$—$O$-$\Phi$-$I$-$\Phi]^+[B(C_6F_5)_4]^-$ $[(\Phi)_3S]^+[B(C_6F_5)_4]^{31}$ $^{[(\Phi)}_2S$-$\Phi$-$O$—$C_8H_{17}]^+[B(C_6H_4CF_3)_4]^-$ $[(C_{12}H_{25}$-$\Phi)_2I]^+[B(C_6F_5)_4]^{-[(\Phi}_3S]^+[B(C_6F_4OCF_3)_4]^-$ $[(\Phi$-$CH_3)_2I]^+[B(C_6F_5)_4]^{-[(\Phi\text{-}CH}_3)_2I]^+[B(C_6F_4OCF_3)_4]^-$ $[CH_3$-$\Phi$-$I$-$\Phi$-$CH(CH_3)_2]^+[B(C_6F_5)_4]^{-(\eta5}$-cyclopentadienyl)($\eta^6$-toluene)$Fe^+[B(C_6F_5)_4]^{-(\eta5}$-cyclopentadienyl) ($\eta^6$-1-methylnaphthalene)$Fe^+[B(C_6F_5)_4]^{-(\eta5}$-cyclopentadienyl) ($\eta^6$-cumene)$Fe^+[B(C_6F_5)_4]^-$ and their mixture.

These polymerization and/or crosslinking cationic photoinitiators can be provided in solution in solvents, such as isopropanol, diacetone alcohol or butyl lactate.

Mention may be made, as other literature references for defining onium borates and organometallic salt borates, to the entire content of patent applications EP 0 562 897 and EP 0 562 922.

Mention may be made, as other examples of onium salt which can be used as photoinitiator, of those disclosed in United States patents U.S. Pat. No. 4,138,255 and U.S. Pat. No. 4,310,469.

Use may also be made of other cationic photoinitiators, for example:
- those sold by Union Carbide (Photoinitiator 6990® and 6974®, triarylsulfonium hexafluorophosphate and hexafluoroantimonate),
- iodonium hexafluorophosphate or hexafluoroantimonate salts, or
- ferrocenium salts of these various anions.

According to one alternative form of the invention, use may be made, as component (c), of a catalytic system composed of a cationic photoinitiator in solution with a polyorganosiloxane, preferably in solution in the polyorganosiloxane POS (B) described above.

According to another alternative form, the cationic photoinitiator can be combined with a radical photoinitiator, for example based on benzophenone. Mention may be made, by way of examples, of those sold by Ciba-Geigy: Irgacure 184®, Irgacure 500®, Darocure 1173®, Irgacure 1700®, Darocure 4265®, Irgacure 907®, Irgacure 369®, Irgacure 261®, Irgacure 784 DO®, Irgacure 2959® and Irgacure 651®.

The radical photoinitiators can also comprise one or more phosphorus atoms, such as those sold by Ciba-Geigy (Irgacure 1700) or BASF (Lucirin TPO).

According to another alternative form, the composition according to the invention comprises at least one aromatic hydrocarbon photosensitizer (e) comprising one or more substituted or unsubstituted aromatic rings having a residual light absorption of between 200 and 500 nm. The photosensitizer (e) present in the composition according to the invention can be highly varied in nature. Use may be made of the photosensitizers disclosed in the documents U.S. Pat. No. 4,939,069, U.S. Pat. No. 4,278,751 and U.S. Pat. No. 4,147,552. Preferably, the photosensitizer (e) is chosen from the group of following compounds:
4,4'-dimethoxybenzoin, 2,4-diethylthioxanthone, 2-ethylanthraquinone, 2-methylanthraquinone, 1,8-dihydroxyanthraquinone, dibenzoyl peroxide, 2,2-dimethoxy-2-phenylacetophenone, benzoin, 2-hydroxy-2-methylpropiophenone, benzaldehyde, 4-(2-hydroxyethoxy)phenyl (2-hydroxy-2-methylpropyl) ketone, benzoylacetone,

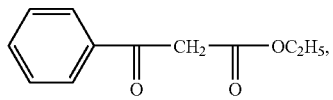

2-isopropylthioxanthone, 1-chloro-4-propoxythioxanthone, 4-isopropylthioxanthone and their mixture.

The composition according to the invention can also comprise reinforcing agents in order to improve the mechanical properties of the polymer electrolyte obtained after polymerization and/or crosslinking. For example, the composition according to the invention can optionally comprise treated silica, treated alumina or polyorganosiloxane resins.

The invention also relates to a solid polymer electrolyte for a battery obtained by polymerization and/or crosslinking, photochemically or under an electron beam, in particular under UV radiation, of the polymerizable and/or crosslinkable composition according to the invention. The irradiation time can be short and it is generally less than 20 seconds. This polymer electrolyte comprises polyoxyalkylene ether functional groups and optionally noncrosslinked residual groups and groups resulting from the opening of the epoxy rings.

Another subject matter of the invention is a battery comprising the solid polymer electrolyte obtained by polymerization and/or crosslinking described above placed between an anode and a cathode. Advantageously, at least one of the constituents of the cathode is chosen from the group consisting of the following entities: lithium metal, lithium alloys, inorganic materials comprising lithium insertions and carbonate materials comprising lithium insertions.

The application of these batteries is particularly suitable for the following fields of storage of electricity: emergency power supplies for industrial and telecommunication systems, secondary power supplies for portable devices, batteries for geostationary satellite applications and batteries for electric and hybrid vehicles.

The following examples are given by way of illustration and they cannot be regarded as a limit on the scope of the invention.

EXAMPLES

Example 1

Preparation of a polyorganosiloxane Carrying Epoxy and polyoxyethylene ether Functional Groups 497.2 g of xylene and 10.1 g of a Pt/charcoal heterogeneous catalyst are introduced into a 2 l reactor equipped with a stirrer with 3 inclined screws, with 2 baffles which make possible the temperature measurement, with 2 membrane pumps and with a dropping funnel. The reaction medium is heated to 80° C. with stirring and under an inert atmosphere of nitrogen. When the temperature of 80° C. is reached, the following reactants are added by running in simultaneously over 3 hours:
- 500.8 g (1.47 mol) of Uniox MA300® allyl polyether from NOF Corporation, on the one hand, via a first membrane pump, and
- 285.1 g of silicone oil comprising SiH functional groups with a structure of $MD'_{50}D_{25}M$ type, where $M=(CH_3)_3SiO_{1/2}$, $D=(CH_3)_2SiO_{2/2}$ and $D'=(CH_3)HSiO_{2/2}$.

When the degree of conversion of the SiH functional groups reaches 40%, 295.2 g of allyl glycidyl ether (molecular weight: 113 g/mol, i.e. 2.6 mol) are run in over 2 h 30. After addition is complete, the degree of conversion is 73%. The reaction mixture is left stirring at 86° C. for 36 hours in order to have a degree of conversion of 100%. After returning to ambient temperature, the reaction medium is filtered. The filtration results in 1801.2 g of transparent catalyst-free product being obtained. Evaporation at 150° C. and under 5 mbar in a rotary evaporator makes it possible to remove the volatile components. Approximately 945 g of final product POS (A) are obtained, this product having a viscosity of 2650 mPa·s and the structure represented by the formula: $M^*-D_{21}-D'_{3.6}-D^{OE}_{9.7}-D^{AGE}_{16.4}-T^{OR}_4-T_{1.6}-M^*$, with:

$D=(CH_3)_2SiO_{2/2}$, $D'=(CH_3)HSiO_{2/2}$, $D^{OE}=(CH_3)R'SiO_{2/2}$, $D^{AGE}=(CH_3)R''SiO_{2/2}$, $T=SiO_{3/2}$, $T^{OR}=(RO)(CH_3)SiO_{2/2}$
with: $M^*$=79% of M units+6% of $D^{OR}$ units+15% of $D^{OH}$ units (as mol %)
$D^{OR}=(CH_3)_2R^aSiO_{1/2}$
$D^{OH}=(CH_3)_2(OH)SiO_{1/2}$
$R^a$=polyether residue;
$R'=-(CH_2)_3-O-(CH_2CH_2-O)_{8-9}-CH_3$; and

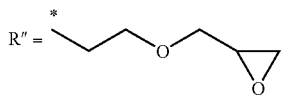

(the * symbol represents the carbon which is bonded to the silicon atom).

Example 2

Crosslinking Under UV Radiation

The products used in the compositions of the examples are as follows:

Silicone POS (B): (Viscosity 23.5 mPa·s):

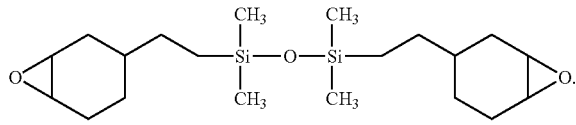

Cationic Photoinitiator (P1):

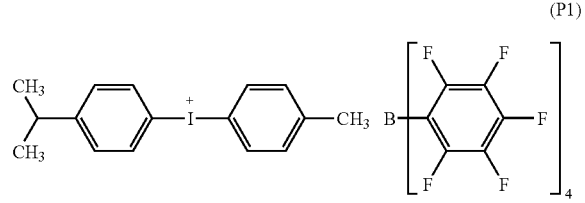

A composition is prepared by mixing:
a) 100 parts of the POS (A) obtained in example 1;
b) 15.57 parts of LiTFSi salt (LiTFSI=lithium bistrifluoromethanesulfonamide); and
c) 3 parts of a polymerization cationic photoinitiator catalytic system comprising:
  c-1) 76.3% by weight of the silicone (B),
  c-2) 21.6% by weight of photoinitiator Rhodorsil Photoinitiator 2074®, sold by Rhodia, with the structure (P1),
  c-3) 1.9% by weight of a solution composed of 4% by weight of Tinuvin-765® (sold by Ciba) in silicone (B), and
  c-4) 0.2% by weight of a photosensitizer (e), 1-chloro-4-propoxythioxanthone.

The composition is crosslinked using a UV lamp over the entire lamp spectrum (UV+visible) with a passage time under the lamp of the order of 3 to 5 m/min, which makes it possible to have crosslinking times of approximately 10 s. Two networks were obtained, the first (N1) following a pass at 10 amperes and the second (N2) by virtue of two passes of 10 amperes and 17 amperes. Networks are obtained in the form of a film with a mean thickness of between 50 and 250 μm.

Example 3

Measurement of the Ionic Conductivity

The ionic conductivity of the crosslinked networks according to example 2 and their changes with temperature was measured via the use of the complex impedance spectrometry technique, which technique makes it possible to determine the characteristic quantities of conductive systems, such as their resistance or their capacity. The film of solid electrolyte is inserted and held fixed between two electrodes made of stainless steel, the entire combination constituting the main measurement cell. This experimental device is positioned inside an oven which makes possible temperature scanning between −20 and +80° C. The cell is connected to a Hewlett Packard HD4192A impedence meter coupled to a computer for recording the data. The cell is subjected to a sinusoidal voltage of 100 mV crest-to-crest in a frequency range extending from $5\times10^{-3}$ Hz to 13 MHz. For each sample, the measurement is carried out after maintaining at the set temperature for Y4 of an hour.

Under these conditions, the ionic conductivities of the crosslinked networks according to example 2 at 25° C., as measured by the complex impedance method, are between $10^{-4}$ and $5\times10^{-6}$ siemens/cm.

What is claimed is:
1. A composition for use in the manufacture of a battery electrolyte, comprising:
  (a) at least one polyorganosiloxane (POS) (A) comprising siloxyl units of formula (I)

$$R^1_xR^2_yR^3_zSiO_{(4-x-y-z)/2} \quad (I)$$

in which formula the various symbols have the following meanings:
  x, y and z are integers with $1 \leq x+y+z \leq 3$;
  the $R^1$, $R^2$ and $R^3$ radicals are identical to or different from one another and represent an optionally substituted, linear or branched, $C_1$-$C_{12}$ alkyl radical, an optionally substituted $C_5$-$C_{10}$ cycloalkyl radical, an optionally substituted $C_6$-$C_{18}$ aryl radical, an optionally substituted aralkyl radical or an —$OR^4$ radical where $R^4$ represents a hydrogen or a linear or branched alkyl radical having from 1 to 15 carbon atoms, and
  wherein the POS (A) comprises, per molecule:
    at least 2 siloxyl units of formula (I), one of the radicals of which comprises a functional group of epoxy type (Epx) and optionally a functional group of ether type (Eth); and
    at least one of the siloxyl units of formula (I) comprises at least one radical carrying a polyoxyalkylene (Poa) ether functional group;
  (b) at least one electrolyte salt; and
  (c) an effective amount of at least one cationic and/or radical photoinitiator, wherein said composition is polymerizable and/or crosslinkable by the cationic and/or radical route under irradiation and/or by (an) electron beam(s), 2. The composition as claimed in claim 1, wherein the composition further comprises at least one POS (B) of formula (II)

$$R^1_xR^2_yR^3_zSiO_{(4-x-y-z)/2} \quad (II)$$

in which formula the various symbols have the following meanings:

x, y and z are integers with $1 \leq x+y+z \leq 3$;

the $R^1$, $R^2$ and $R^3$ radicals are identical to or different from one another and represent an optionally substituted, linear or branched, $C_1$-$C_{12}$ alkyl radical, an optionally substituted $C_5$-$C_{10}$ cycloalkyl radical, an optionally substituted $C_6$-$C_{18}$ aryl radical, an optionally substituted aralkyl radical or an —$OR^4$ radical where $R^4$ represents a hydrogen or a linear or branched alkyl radical having from 1 to 15 carbon atoms;

with the condition that the POS (B) comprises, per molecule, at least 2 siloxyl units comprising a functional group of epoxy type (Epx) and optionally a functional group of ether type (Eth).

3. The composition as claimed in claim 1, wherein the radical carrying a functional group of epoxy type (Epx) which can optionally carry a functional group of ether type (Eth) is selected from the following radicals:

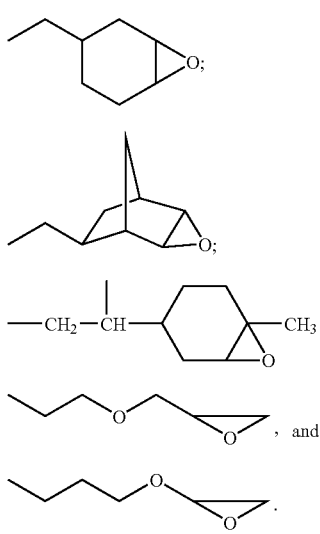

4. The composition as claimed in claim 1, wherein the polyoxyalkylene (Poa) ether group is of polyoxyethylene ether and/or polyoxypropylene ether type.

5. The composition as claimed in claim 1, wherein the POS (A) is an essentially linear random or block copolymer having the mean general formula (VIII)

tuted $C_6$-$C_{18}$ aryl radical, an optionally substituted $C_5$-$C_{10}$ cycloalkyl radical or an optionally substituted aralkyl radical;

the Z symbols, which are identical to or different from one another, each represent a hydroxyl radical or a linear or branched alkoxyl radical having from 1 to 15 carbon atoms;

the R' symbols, which are identical to or different from one another, each represent a radical comprising from 2 to 50 carbon atoms;

the Poa symbols, which are identical to or different from one another, each represent groups of polyoxyalkylene ether type;

the R" symbols, which are identical to or different from one another, each represent a radical comprising from 2 to 50 carbon atoms, which radical can optionally comprise functional groups of —O— ether type;

the (Epx) symbols represent an epoxy functional group, this functional group being either present as ending of the R" hydrocarbon chain, of the following type:

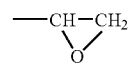

or in an intermediate position of the R" hydrocarbon chain, of the following type:

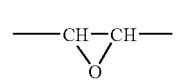

it being possible for this intermediate position of this epoxy functional group to be present on a cyclic part of the chain, in particular a ring having from 5 to 7 members;

the A symbols, which are identical to or different from one another, each represent a monovalent radical selected from —R, H, —R"-Epx and —$OR^4$, where $R^4$ represents a hydrogen or a linear or branched alkyl radical having from 1 to 15 carbon atoms;

m is an integer or fractional number greater than or equal to 0;

n is an integer or fractional number varying from 0 to 5;

o is an integer or fractional number greater than or equal to 1;

p is an integer or fractional number greater than or equal to 2; and

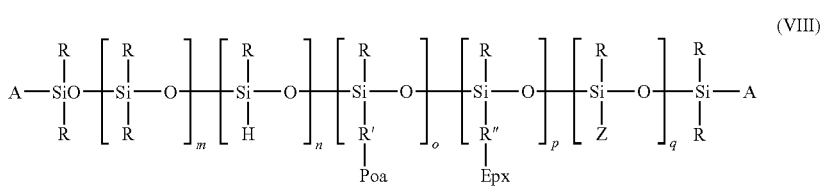

which can optionally comprise units of formula $RSiO_{3/2}$ (T); in which formula:

the R symbols, which are identical to or different from one another, each represent an optionally substituted, linear or branched, $C_1$-$C_{12}$ alkyl radical, an optionally substiq is an integer or fractional number greater than or equal to 0.

6. The composition as claimed in claim 5, wherein the numbers m, o p and q satisfy the following condition:

the ratio $(m+n+p+q)/o \leq 10$.

7. The as claimed in claim 5, wherein the groups of —R″-Epx type are selected from the group consisting of:

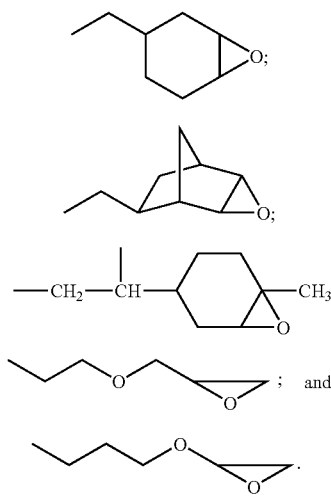

8. The composition as claimed in claim 5, wherein the —R′-Poa groups are selected from:
—(CH$_2$)$_3$—O—(CH$_2$CH$_2$—O)$_m$—CH$_3$; —(CH$_2$)$_2$—O—(CH$_2$CH$_2$—O)$_m$—CH$_3$; and —(CH$_2$)$_3$—O—(CH(CH$_3$)—CH$_2$—O)$_m$—CH$_3$ and —(CH$_2$)$_2$—O—(CH(CH$_3$)—CH$_2$—O)$_m$—CH$_3$, with m≦14.

9. The composition as claimed in claim 1, wherein the electrolyte salt (b) is composed:
of a cation selected from the group consisting of metal cations, ammonium ions, amidinium ions and guanidinium ions; and
of an anion selected from the group consisting of chloride ions, bromide ions, iodide ions, perchlorate ions, thiocyanate ions, tetrafluoroborate ions, nitrate ions, AsF$_6^-$, PF$_6^-$, stearylsulfonate ions, trifluoromethanesulfonate ions, octylsulfonate ions, dodecylbenzenesulfonate ions, R$^4$SO$_3^-$, (R$^4$SO$_2$)(R$^5$SO$_2$)N$^-$ and (R$^4$SO$_2$)(R$^5$SO$_2$)(R$^6$SO$_2$)C$^-$; in each formula, the R$^4$, R$^5$ and R$^6$ radicals are identical or different and represent electron-withdrawing groups.

10. The composition as claimed in claim 9, wherein the R$^4$, R$^5$ and R$^6$ radicals are perfluoroaryl or perfluoroalkyl type radicals, wherein the perfluoroalkyl groups comprising from 1 to 6 carbon atoms.

11. The composition as claimed in claim 9, wherein the electrolyte salt (b) comprises a metal cation selected from alkali metals and alkaline earth metals of Groups 1 and 2 of the Periodic Table.

12. The composition as claimed in claim 11, wherein the metal cation is lithium.

13. The composition as claimed in claim 1, wherein the electrolyte salt (b) is selected from the group consisting of LiClO$_4$, LiBF$_4$, LiPF$_6$, LiAsF$_6$, LiCF$_3$SO$_3$, LiN(CF$_3$SO$_2$)$_2$, and LiN(C$_2$F$_5$SO$_2$)$_2$ and a mixture of these compounds.

14. The composition as claimed in claim 11, wherein the metal cation is a transition metal.

15. The as claimed in claim 14, wherein the metal cation is selected from the group consisting of manganese, iron, cobalt, nickel, copper, zinc, calcium and silver.

16. The composition as claimed in claim 1, it comprises further comprising an organic electrolyte (d).

17. The composition as claimed in claim 16, wherein the organic electrolyte (d) is selected from the group consisting of propylene carbonate, ethylene carbonate, diethyl carbonate, dimethyl carbonate, ethyl methyl carbonate, γ-butyrolactone, 1,3-dioxolane, dimethoxyethane, tetrahydrofuran, dimethyl sulfoxide and polyethylene glycol dimethyl ether.

18. The composition as claimed in claim 1, wherein the polymerization and/or crosslinking cationic photoinitiator (c) is an onium borate.

19. The composition as claimed in claim 18, wherein the onium borate comprises a cation from:
a) onium cations of formula (IX)

$$[(R^1)_n-A-(R^2)_m]^+ \quad (IX)$$

in which formula:
A represents an element from groups 15 to 17, such as, for example: I, S, Se, P or N;
R$^1$ represents a C$_6$-C$_{20}$ carbocyclic or heterocyclic aryl radical, it being possible for said heterocyclic radical to comprise nitrogen or sulfur as heteroelements;
R$^2$ represents R$^1$ or a linear or branched C$_1$-C$_{30}$ alkyl or those radical;
said R$^1$ and R$^2$ radicals optionally being substituted by a C$_1$-C$_{25}$ alkoxy, C$_1$-C$_{25}$ alky, nitro, chloro, bromo, cyano, carboxyl, ester or mercapto group;
n is an integer ranging from 1 to v+1, v being the valency of the element A; and
m is an integer ranging from 0 to v−1, with n+m=v+1,
b) organometallic cations of formula (X)

$$(L^1L^2L^3M)^{q+}$$

in which formula:
M represents a metal from Groups 4 to 10, in particular iron, manganese, chromium or cobalt;
L$^1$ represents a ligand bonded to the metal M via π electrons, which ligand is chosen from η$^3$-alkyl, η$^5$-cyclopentadienyl and η$^7$-cycloheptatrienyl ligands and η$^6$-aromatic compounds chosen from η$^6$-benzene ligands which are optionally substituted and compounds having from 2 to 4 condensed rings, each ring being capable of contributing via 3 to 8 π electrons to the valence layer of the metal M;
L$^2$ represents a ligand bonded to the metal M via π electrons, which ligand is chosen from η$^7$-cycloheptatrienyl ligands and η$^6$-aromatic compounds chosen from η$^6$-benzene ligands which are optionally substituted and compounds having from 2 to 4 condensed rings, each ring being capable of contributing via 6 or 7 π electrons to the valence layer of the metal M; and
L$^3$ represents from 0 to 3 identical or different ligands bonded to the metal M via σ electrons, which ligand(s) is (are) chosen from CO and NO$_2^+$; the total electronic charge of the complex to which L$^1$, L$^2$ and L$^3$ and the ionic charge of the metal M contribute being positive and equal to 1 or 2;
c) oxoisothiochromanium cations having the formula (XI)

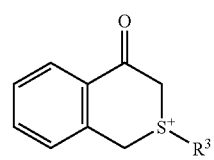

(XI)

where the R³ radical represents a linear or branched C$_1$-C$_{20}$ alkyl radical, and d) the organometallic cations of formula (XIII)

$$(L^1L^2L^3M)^{q+} \quad (XIII)$$

in which formula:

M represents a metal from Groups 4 to 10;

L¹ and L² each represent a ligand bonded to the metal M via π electrons,

L³ represents from 0 to 3 identical or different ligands bonded to the metal M via σ electrons, which ligand(s) is (are) chosen from CO and NO$_2$⁺; and the total electronic charge q being positive and equal to 1 or 2.

20. The composition as claimed in claim 18, wherein the polymerization and/or crosslinking cationic photoinitiator (c) of borate type comprises an anion having the formula (XII)

$$[BX_aR_b]^- \quad (XII)$$

in which formula:

a and b are integers ranging from 0 to 4 with a+b=4;

the X symbols represent a chlorine atom or a fluorine atom when a=0 to 3 and an OH functional group (when a=0 to 2), the R symbols are identical or different and represent:

a phenyl radical substituted by at least one electron-withdrawing group selected from CF$_3$, NO$_2$ and CN or by at least 2 fluorine atoms, this being the case when the cationic entity is an onium of an element from Groups 15 to 17, a phenyl radical substituted by at least one electron-withdrawing element or at least one electron-withdrawing group selected from a fluorine atom, CF$_3$, NO$_2$ and CN, this being the case when the cationic entity is an organometallic complex of an element from the Groups 4 to 10, and/or an aryl radical comprising at least two aromatic rings which is optionally substituted by at least one electron-withdrawing element or at least one electron-withdrawing group selected from a fluorine atom, CF$_3$, NO$_2$ or CN, whatever the cationic entity.

21. The composition as claimed in claim 20, wherein the anionic entity of the borate is selected from the group consisting of:

[B(C$_6$F$_5$)$_4$]⁻, [B(C$_6$H$_4$CF$_3$)$_4$]⁻, [B(C$_6$H$_4$CF$_3$)$_4$]⁻, [(C$_6$F$_5$)$_2$BF$_2$]⁻, [C$_6$F$_5$BF$_3$]⁻, [B(C$_6$H$_3$F$_2$)$_4$]⁻, and [B(C$_6$F$_4$OCF$_3$)$_4$]⁻.

22. The composition which can be polymerized and/or crosslinked under irradiation, preferably actinic irradiation and/or by (an) electron beam(s), by the cationic and/or radical route, for a battery electrolyte as claimed in claim 19, wherein the cationic entity is selected from the group consisting of:

[(Φ)$_2$I]⁺, [C$_8$H$_{17}$—O-Φ-I-Φ]⁺, [(Φ-CH$_3$)$_2$I]⁺, [C$_{12}$H$_{25}$-Φ-I-Φ]⁺, [(C$_8$H$_{17}$—O-Φ)$_2$I]⁺, [C$_8$H$_{17}$—O-Φ-I-Φ]⁺, [(Φ)$_3$S]⁺, [(Φ)$_2$-S-Φ-O—C$_8$H$_{17}$]⁺, [CH$_3$-Φ-I-Φ-CH(CH$_3$)$_2$]⁺, [Φ-S-Φ-S-(Φ)$_2$]⁺, [(C$_{12}$H$_{25}$-Φ)$_2$I]⁺, [CH$_3$-Φ-I-Φ-OC$_2$H$_5$]⁺, (η5-cyclopentadienyl)(η6-toluene)Fe⁺, (η5-cyclopentadienyl)(η6-1-methylnaphthalene)Fe⁺, and (η5-cyclopentadienyl)(η6-cumene)Fe⁺.

23. The composition as claimed in claim 18, wherein the polymerization and/or crosslinking cationic photoinitiator (c) of borate type is selected from the group consisting of:

[(Φ)$_2$I]⁺[B(C$_6$F$_5$)$_4$]⁻; [(C$_8$H$_{17}$)-O-Φ-I-Φ]⁺[B(C$_6$F$_5$)$_4$]⁻, [C$_{12}$H$_{25}$-Φ-I-Φ]⁺[B(C$_6$F$_5$)$_4$]⁻; [(C$_8$H$_{17}$—O-Φ)$_2$I]⁺[B(C$_6$F$_5$)$_4$]⁻, [(C$_8$H$_{17}$)—O-Φ-I-Φ]⁺[B(C$_6$F$_5$)$_4$]⁻; [(Φ)$_3$S]⁺[B(C$_6$F$_5$)$_4$]⁻, [(Φ)$_2$S-Φ-O—C$_8$H$_{17}$]⁺[B(C$_6$H$_4$CF$_3$)$_4$]⁻; [(C$_{12}$H$_{25}$-Φ)$_2$I]⁺[B(C$_6$F$_5$)$_4$]⁻, [(Φ)$_3$S]⁺[B(C$_6$F$_4$OCF$_3$)$_4$]⁻; [(Φ-CH$_3$)$_2$I]⁺[B(C$_6$F$_5$)$_4$]⁻, [(Φ-CH$_3$)$_2$I]⁺[B(C$_6$F$_4$OCF$_3$)$_4$]⁻; [CH$_3$-Φ-I-Φ-CH(CH$_3$)$_2$]⁺[B(C$_6$F$_5$)$_4$]⁻, (η$^5$-cyclopentadienyl)(η$^6$-toluene)Fe⁺[B(C$_6$F$_5$)4]⁻, (η$^5$-cyclopentadienyl)(η$^6$-1-methylnaphthalene)Fe⁺[B(C$_6$F$_5$)$_4$]⁻, and (η$^5$-cyclopentadienyl) (η$^6$-cumene)Fe⁺[B(C$_6$F$_5$)$_4$]⁻, and their mixture.

24. The composition as claimed in claim 1, wherein it comprises at least one aromatic hydrocarbon photosensitizer (e) comprising one or more substituted or unsubstituted aromatic rings having a residual light absorption of between 200 and 500 nm.

25. The composition claimed in claim 24, wherein the photosensitizer (e) is selected from the group consisting of:

4,4'-dimethoxybenzoin, 2,4-diethylthioxanthone, 2-ethylanthraquinone, 2-methylanthraquinone, 1,8-dihydroxyanthraquinone, dibenzoyl peroxide, 2,2-dimethoxy-2-phenylacetophenone, benzoin, 2-hydroxy-2-methylpropiophenone, benzaldehyde, 4-(2-hydroxyethoxy)phenyl (2-hydroxy-2-methylpropyl) ketone, benzoylacetone,

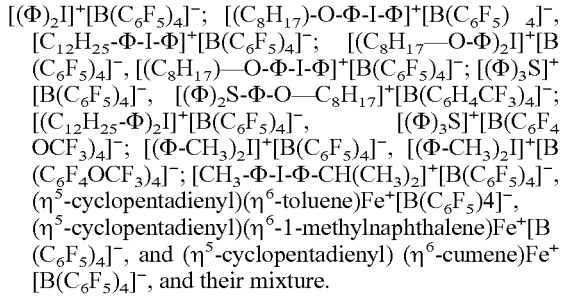

2-isopropylthioxanthone, 1-chloro-4-propoxythioxanthone, and 4-isopropylthioxanthone and mixtures thereof.

26. A polymer electrolyte for a battery obtained by polymerization and/or crosslinking by the cationic and/or radical route of a composition as claimed in claim 1.

27. A polymer battery comprising a polymer electrolyte as claimed in claim 26 positioned between an anode and a cathode.

28. The polymer battery as claimed in claim 27, wherein at least one of the constituents of the cathode is selected from the group consisting of the following compounds:

lithium metal, lithium alloys, inorganic materials comprising lithium insertions and carbonate materials comprising lithium insertions.

* * * * *

UNITED STATES PATENT AND TRADEMARK OFFICE
CERTIFICATE OF CORRECTION

PATENT NO. : 7,744,772 B2  Page 1 of 1
APPLICATION NO. : 10/551712
DATED : June 29, 2010
INVENTOR(S) : Lucile Gambut-Garel et al.

It is certified that error appears in the above-identified patent and that said Letters Patent is hereby corrected as shown below:

Claim 7, column 15, line 1, please change "The as claimed" to --The composition as claimed--.

Claim 15, column 15, line 62, please change "The as claimed" to --The composition as claimed--.

Signed and Sealed this

Twenty-first Day of December, 2010

David J. Kappos
*Director of the United States Patent and Trademark Office*